United States Patent [19]

Merkel et al.

[11] 4,150,886

[45] Apr. 24, 1979

[54] MOTION PICTURE PROJECTOR SYSTEM

[75] Inventors: Stephen L. Merkel, Bay Village; Charles B. Small, Elyria, both of Ohio; Barton F. Norton, Columbia, Md.

[73] Assignee: Airborne Mfg. Co., Elyria, Ohio

[21] Appl. No.: 717,879

[22] Filed: Aug. 26, 1976

[51] Int. Cl.² .............................................. G03B 1/00
[52] U.S. Cl. ..................................... 352/166; 352/14; 352/173; 352/180; 352/221; 226/184
[58] Field of Search ................... 352/79, 80, 166, 223, 352/228, 180, 198, 200, 224, 173, 221, 14; 354/270; 226/181, 184

[56] References Cited

U.S. PATENT DOCUMENTS

| | | | |
|---|---|---|---|
| 2,015,261 | 9/1935 | Eckler | 354/270 |
| 3,296,923 | 1/1967 | Miles | 352/198 |
| 3,565,521 | 2/1971 | Butler | 352/180 |
| 3,606,526 | 9/1971 | Smith | 352/166 |
| 3,692,394 | 9/1972 | Bauer | 352/180 |
| 3,730,616 | 5/1973 | Fliesser | 352/166 |
| 3,819,258 | 6/1974 | Butler | 352/166 |
| 3,841,743 | 10/1974 | Thevenaz | 352/198 |
| 3,912,383 | 10/1975 | Stutz | 352/166 |
| 4,014,112 | 3/1977 | Christopherson | 352/80 |
| 4,022,525 | 5/1977 | Boudouris | 352/180 |

FOREIGN PATENT DOCUMENTS

| | | | |
|---|---|---|---|
| 884192 | 8/1943 | France | 352/224 |
| 304543 | 8/1971 | U.S.S.R. | 352/228 |

Primary Examiner—Monroe H. Hayes

[57] ABSTRACT

A projector for motion picture film includes a servo motor which is controlled to advance film frame by frame to a projection station. A capstan on each side of the projection station is controlled to maintain film loops of substantially constant size and an associated reel motor delivers film to and takes film from each capstan. Each associated capstan and reel motor are controlled so as to maintain substantially constant tension on the film. A film guide defines the projection station and also includes provision for masking peripheral areas of each frame. Each capstan and an associated pinch roller are designed so as to eliminate creeping of film from between the two. A circuit for controlling the reel motors is arranged to permit fast winding of film directly from one reel to the other with an automatic braking feature.

26 Claims, 14 Drawing Figures

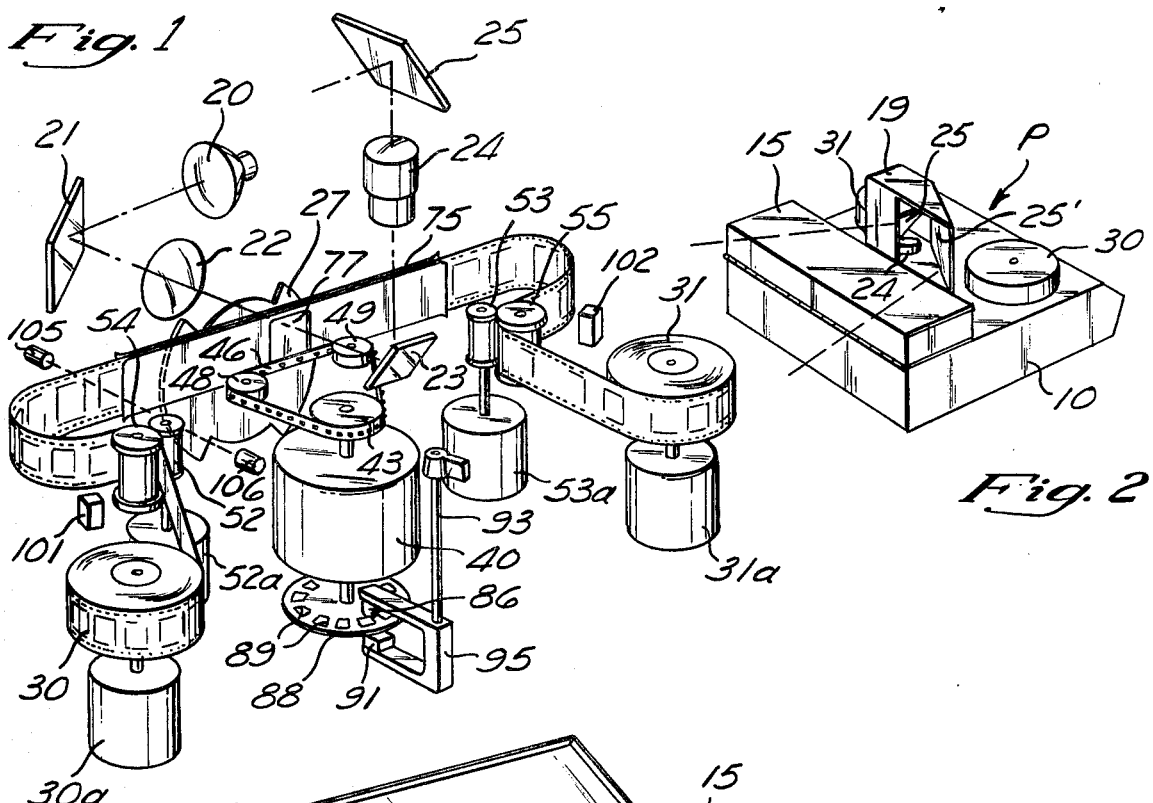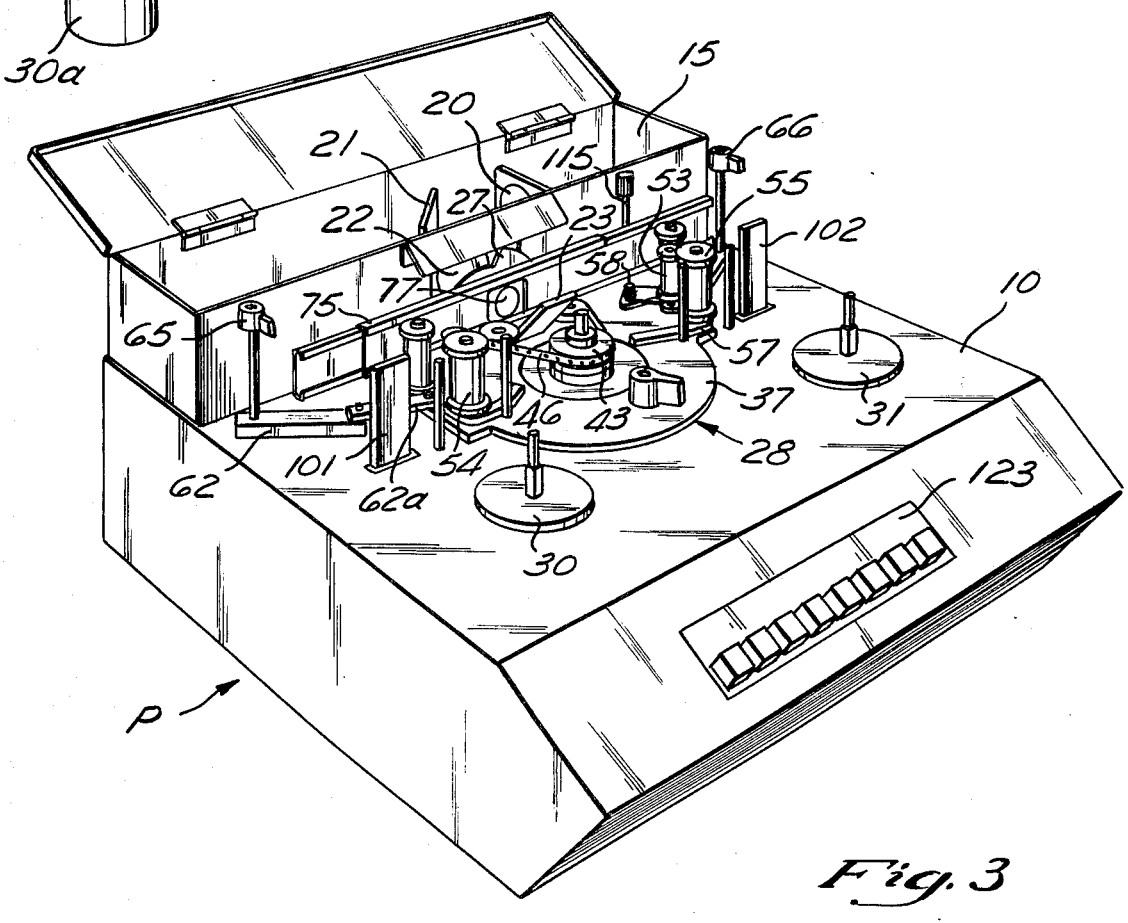

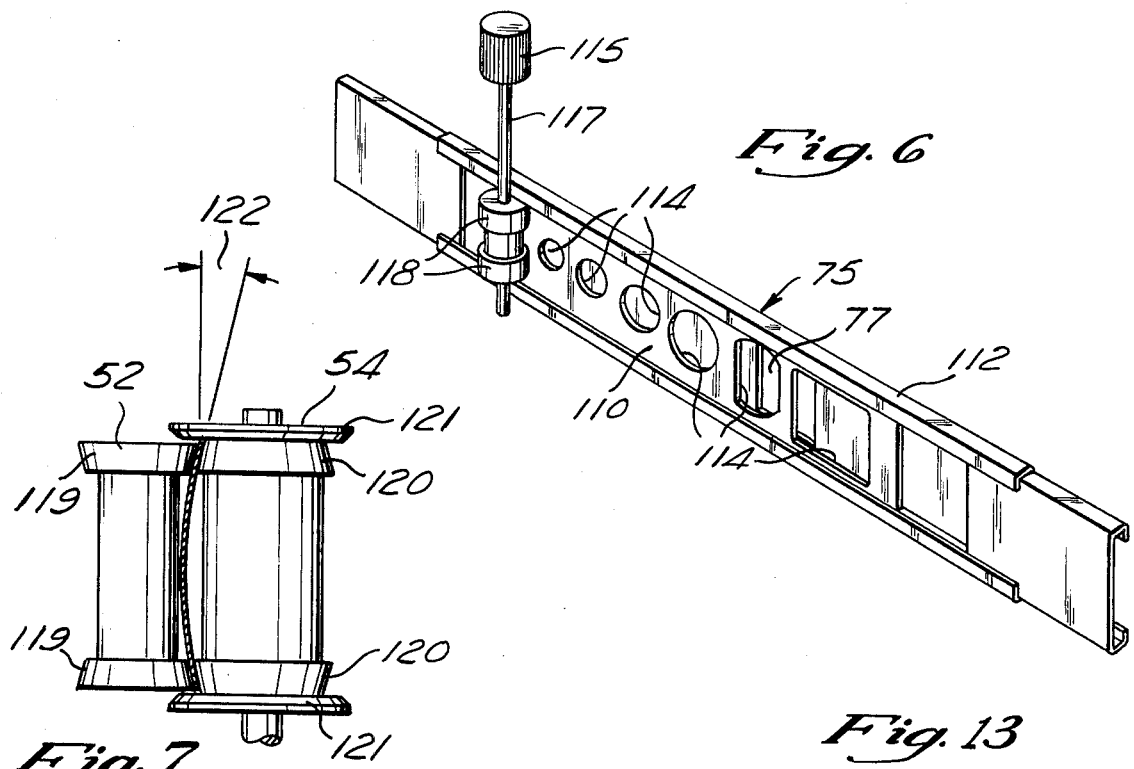
Fig. 6
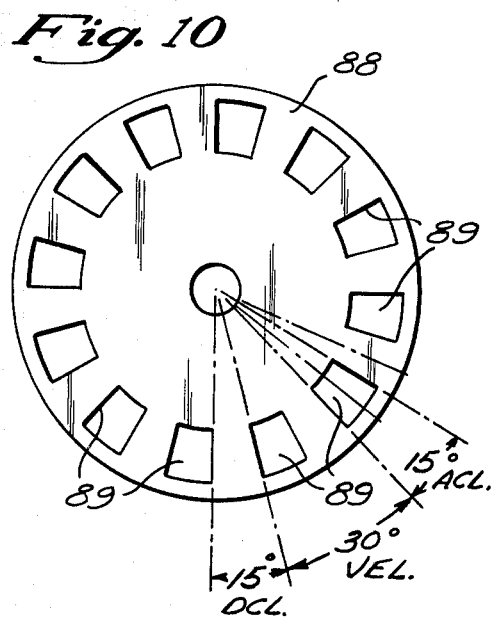
Fig. 7
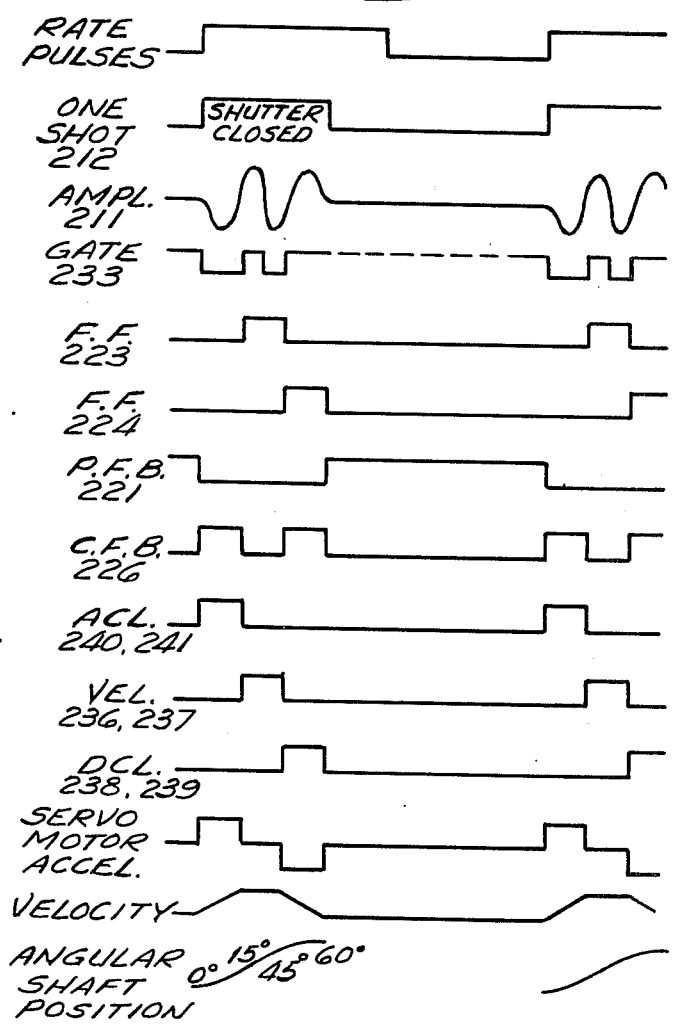
Fig. 10
Fig. 13

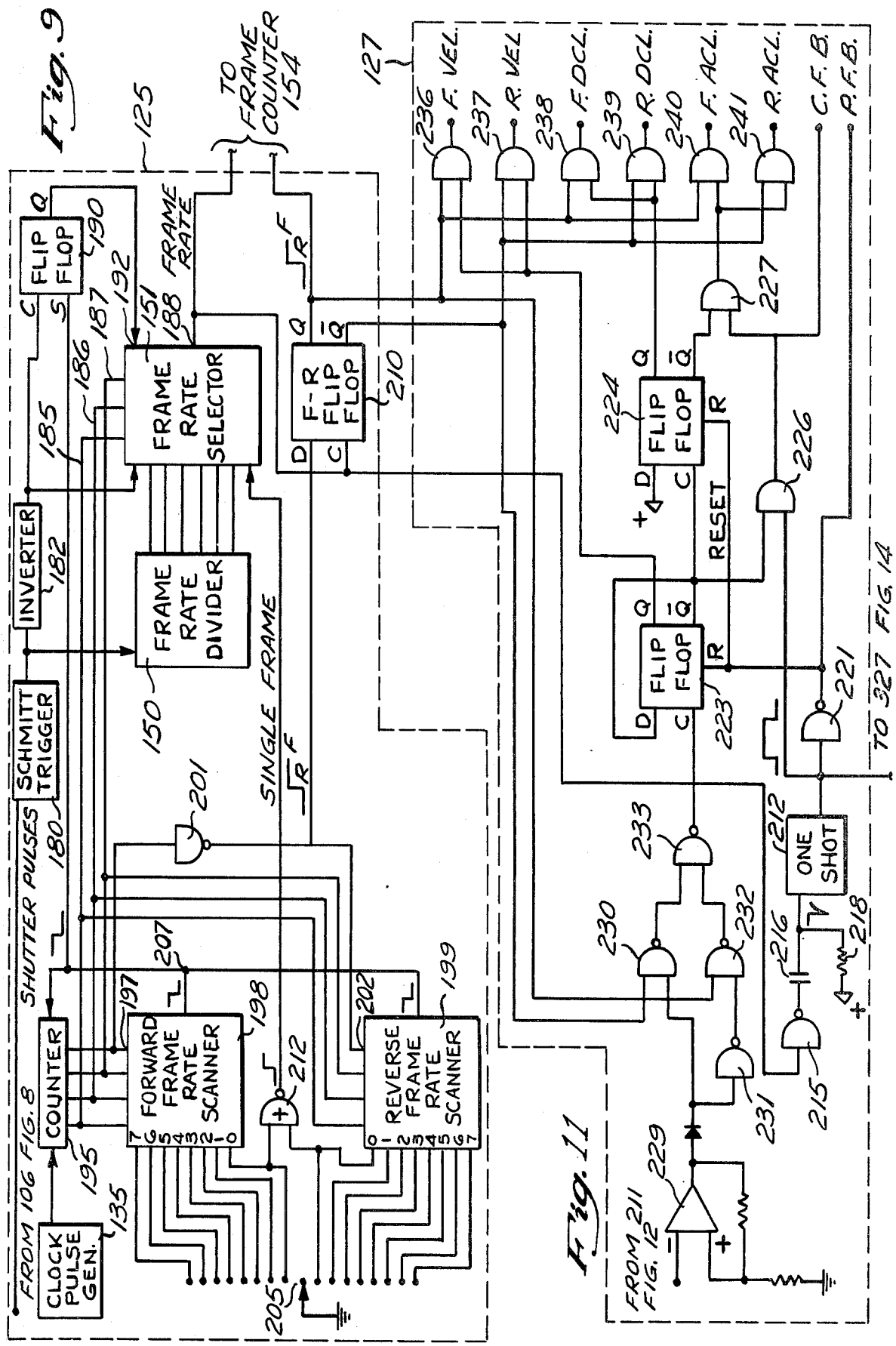

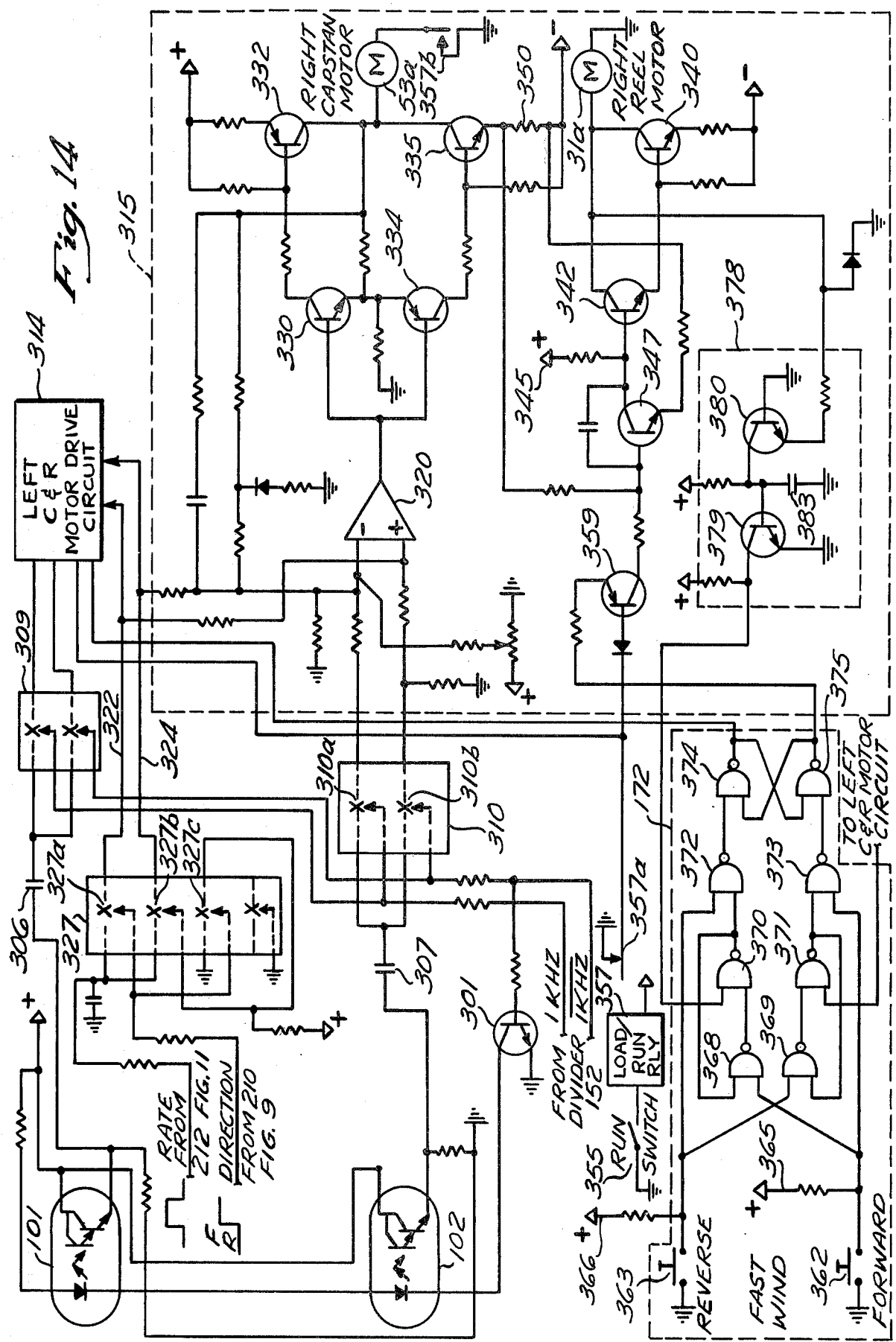

MOTION PICTURE PROJECTOR SYSTEM

BACKGROUND OF THE INVENTION

This invention relates to motion picture projectors and more particularly to such projectors which are adapted for analysis of relative motion or other relationships between elements in the pictures.

In many diverse fields, motion pictures are projected at speeds many times slower than they were originally photographed to analyze motion and action or to pinpoint a particular frame or photograph which best illustrates a relationship between elements in the pictures. Such applications include but are not limited to medicine, sports, product testing, surveillance, reconnaissance, time and motion study and motion picture editing.

In all of these applications the viewing situation is similar. A large volume of photographic material is available for review which contains relatively small areas of particular interest to the viewer. The locations of these areas are unknown to the viewer who must be able to efficiently scan the volume of material, locate portions of interest and intensively review certain sections over and over.

When a viewer is engaged in intensive review of a small portion of the material, the content and the changing elements of the individual photographs or frames are of primary importance. Anything which introduces extraneous motion or the appearance of motion degrades the ability of the viewer to make the analytical judgments required in the motion analysis. The optimum image presentation is one in which the viewer can move a single frame or picture in either direction at will without detection of anything but the motion of the subject material between the frames in question.

Most projectors employed for the purposes described above employ a rotating shutter which interrupts the light path a given number of times per second. The projectors attempt to advance a frame during the off or blocking position of the shutter. One problem with many of such projectors is a failure to confine the advancing of the film to the precise period of time when the shutter is fully closed. Any movement of the frame to be exposed during the open portion of the shutter cycle is perceived by the viewer and can appear to be image movement which severely handicaps the viewer's ability to analyze motion.

Another problem with many existing projectors is the inability to precisely position one frame after another at substantially the same spot in a light path. This may result in vertical and horizontal motion of the frame image and appear to the viewer as subject motion.

Other problems occur in changing direction of film movement which may result in shifting of the image or frame motion because of "free play" in the frame positioning apparatus between forward and reverse drive mechanisms.

SUMMARY OF THE INVENTION

A general object of this invention is to provide a projector which overcomes the disadvantages described above encountered with prior projectors.

A projector embodying the present invention includes means for defining a frame aperture, means for projecting a beam of light through the aperture and a shutter for periodically interrupting the light beam. A servo motor is provided along with means for connecting the servo motor to the film. A control circuit for the servo motor causes it to position a frame of film in the frame aperture during the interruption of the light beam. A capstan and pinch roller are provided on each side of the frame aperture along with a motor driven reel adjacent each of the capstans for storing film. Each capstan motor is controlled by a circuit to maintain a substantially constant amount of film stored in a film loop between the capstan and the frame aperture. A control circuit is provided for each of the reel motors to cause each reel to take film from and deliver film to the associated capstan.

According to a more particular aspect of the invention, each frame of film is advanced during the period when the shutter is closed by accelerating the servo motor for a predetermined angular distance, driving it at substantially constant velocity for another predetermined angular distance, decelerating it and positioning the frame precisely within the frame aperture. This sequence is repeated more or less often according to a selected frame advance rate.

According to another particular aspect of the invention, the projector employs a removable gate assembly, the gate assembly carrying substantially all of the parts which must be changed in order to view film of different size.

According to yet another particular aspect of the invention, a film guide which defines the frame aperture includes provision for masking peripheral or less interesting areas of any or all frames so that attention can be concentrated upon areas of particular interest.

According to another particular aspect of the invention, there is provided an arrangement for controlling the fast winding of film directly from reel to reel which incorporates an automatic braking feature.

According to another particular aspect of the invention, the control circuit for each reel motor is referenced to the control circuit for the corresponding capstan motor to maintain substantially constant tension on the film.

According to still another particular aspect of the invention, each capstan and pinch roller combination is so designed as to substantially eliminate creeping of film from between the two.

These and othr general and particular aspects of the present invention will become apparent in connection with the detailed description of apparatus embodying the invention provided hereinafter.

BRIEF DESCRIPTION OF THE DRAWINGS

FIG. 1 is a diagrammatic perspective showing the principal mechanical parts of a motion picture projector embodying the present invention.

FIG. 2 is a perspective of the projector prepared for use.

FIG. 3 is a perspective of the projector with the covers removed showing the film driving apparatus.

FIG. 6 is a perspective of the rear side of the projector film guide showing the frame masking apparatus.

FIG. 7 is a side elevation of a capstan and pinch roller embodying an aspect of the present invention in driving contact with a motion picture film.

FIG. 9 is a logic diagram of the frame control circuit.

FIG. 10 is a plan view of a slotted disc carried by the servo motor shaft.

FIG. 11 is a logic diagram of a portion of the servo motor control circuit.

FIG. 13 is a timing diagram illustrating the sequence of events involved in the advancing of each frame of the motion picture film.

FIG. 14 is a combined block and schematic diagram of the reel and capstan motor control circuit.

DESCRIPTION OF A PREFERRED EMBODIMENT

Optical and Mechanical Portions of Projector

Figure 4:
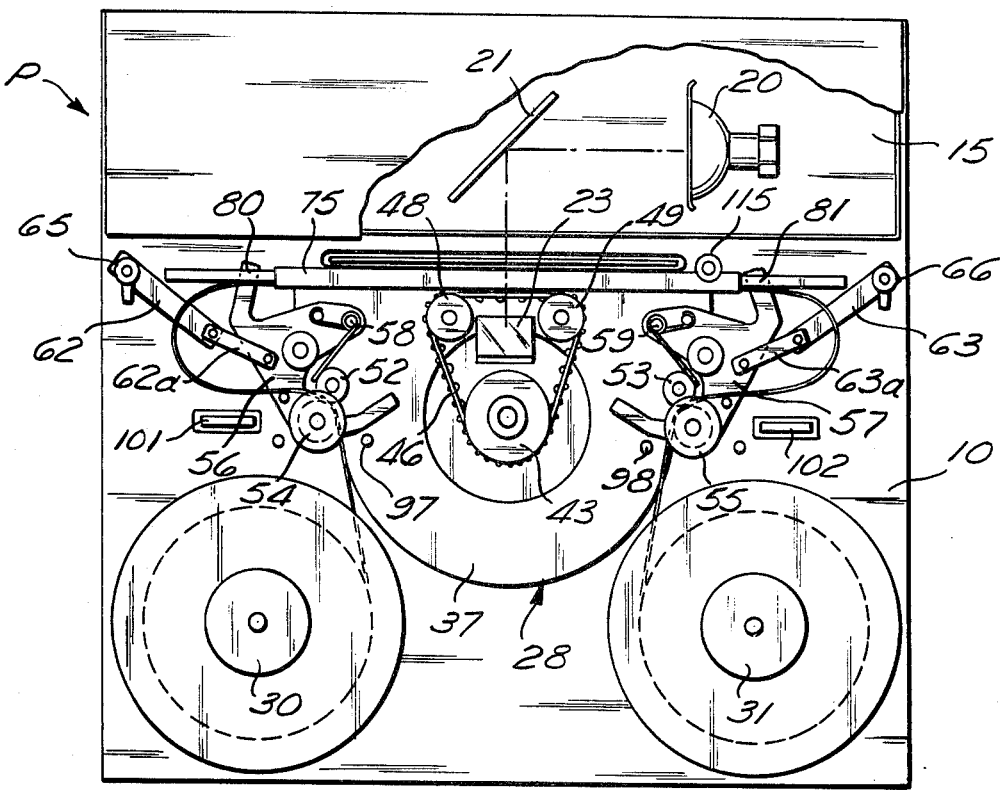
FIG. 4 is a plan view of the projector with the cover removed and film loaded.

Referring initially to FIGS. 1 to 5, a projector P embodying the present invention includes a housing 10 with a lamp enclosure 15, a projection lens support 17 (FIG. 5) and a mirror box 19 (FIG. 2). A high intensity lamp 20 and a mirror 21 are positioned within lamp enclosure 15. A condensor lens 22 is mounted in the wall of lamp enclosure 15. A mirror 23 is mounted on the housing 10 and a projection lens 24 is mounted on projection lens support 17. A mirror 25 forms one wall of mirror box 19. These parts generally comprise the optical or light projecting apparatus of the projector. By means of these elements a light beam is generated and reflected through a path which includes a single frame of film and projects the image contained thereon onto a screen. The reflecting surfaces of lamp 20 and mirror 21 are dichroic, that is, are designed to reflect only visible light so that heat on the film from infra-red rays is minimized. A shutter 27 rotating at a constant speed alternately blocks and passes the light beam provided by lamp 20. The path of the light beam is shown in FIG. 1.

Figure 5:
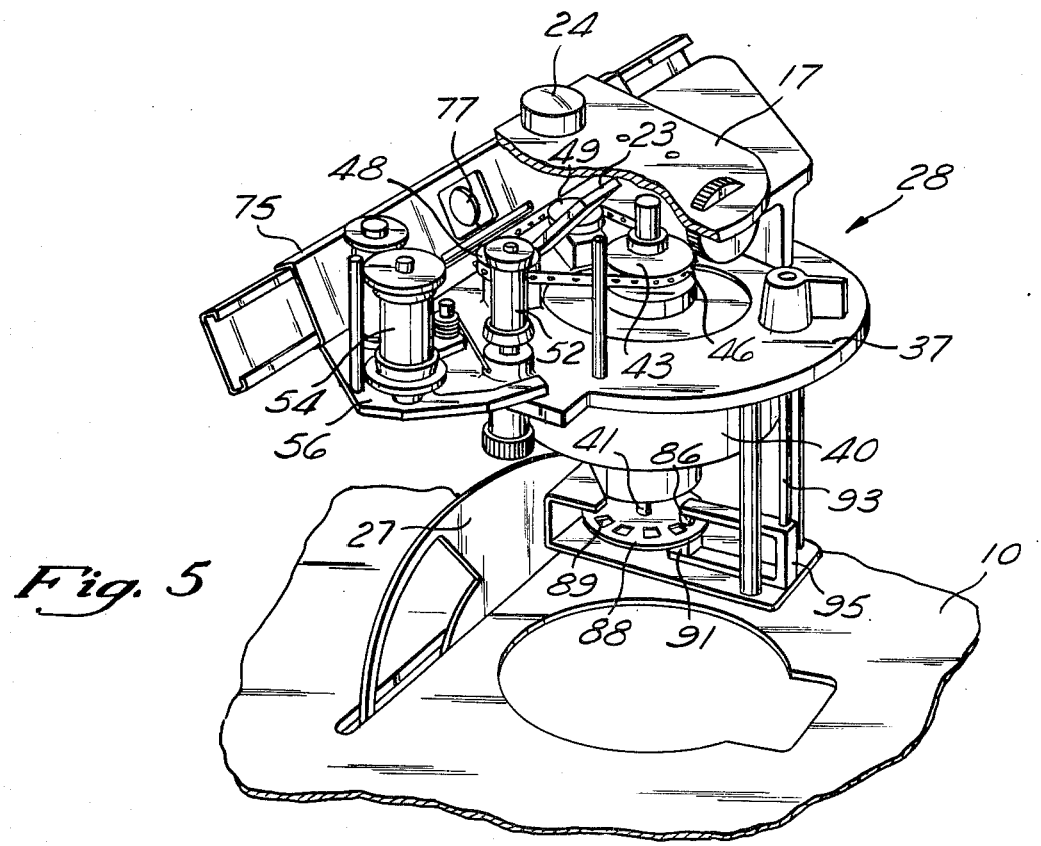
FIG. 5 is a perspective of the projector gate assembly removed from the projector housing.

The remaining major parts of the projector comprise the film drive apparatus, the function of which is to advance and position a frame of film for projection during the light blocking position of the shutter. The film drive apparatus is mounted on the projector housing 10 and includes a gate assembly 28 and left and right film reels 30 and 31 with reel motors 30a and 31a. The forward direction of film movement is such that left reel 30 is the pay-out reel and right reel 31 is the take-up reel. The gate assembly 28 in general, carries all of the film drive apparatus which must be changed for different sizes of film. The gate assembly is readily removable as a unit from the housing and replaceable with another unit as illustrated in FIG. 5. The gate assembly includes a base plate 37 having a central opening in which is mounted a servo motor 40. The servo motor may be a model No. 33VM manufactured by Micro Switch. A drive sprocket 43 is mounted on the shaft of the servo motor and engages a film drive tape 46 which also meshes with a pair of idling sprockets 48 and 49. Drive tape 46 has outwardly projecting teeth which engage with slots in the film and advance it in the appropriate direction in accordance with the direction of rotation of servo motor 40. The drive tape is described fully and claimed in copending application Ser. No. 718,831 filed Aug. 30, 1976 now U.S. Pat. No. 4,079,633 which is assigned to the Assignee of the present application.

A left capstan 52 with motor 52a and a right capstan 53 with motor 53a are also mounted on base plate 37 of the gate assembly. Each capstan has an associated pinch roller 54, 55 which are mounted on, respectively, a left load plate 56 and a right load plate 57. The load plates are pivotally mounted to base plate 37 by means of, respectively, pins 58 and 59. The load plates are connected by means of links 62, 62a and 63, 63a to load rods 65 and 66. Load plates 56 and 57 are moved by means of load rods 65 and 66 between a film load position shown in FIG. 5 and a film run position shown in FIGS. 3 and 4.

A film guide 75 is mounted along the front edge of gate assembly base plate 37 and has a central film aperture 77. As its name indicates, film guide 75 guides a length of film to and past the film aperture 77. In the run position perforations on the film within the film guide engage with drive tape 46. The film guide is connected to load plates 56 and 57 at 80, 81 (FIG. 4) and is mounted so that it is pivoted along its bottom edge between a vertical run position shown in FIG. 4 and a load position shown in FIG. 5 where the upper edge is pivoted away from drive tape 46 to permit loading of the film.

A servo motor shaft position sensing arrangement is supported at the lower end of servo motor shaft 41. The position sensing arrangement includes a light source 86 such as an LED, a disc 88 having twelve circumferentially spaced slots 89 therein and a light sensor 91 such as a phototransistor. A frame positioning rod 93 extends through base plate 17 and is mechanically connected to a mounting bracket 95 which carries light source 86 and light sensor 91. The servo motor 40 is controlled so that it will rotate to maintain a position established by the position sensing arrangement. Positioning rod 93 may be used to move the light source and sensor and cause the servo motor to follow in the event that a frame of film is not precisely centered in film aperture 77. The position sensing arrangement is also used in the servo motor control circuit as will be described more fully below.

As mentioned above, gate assembly 28 contains substantially all the apparatus which must be changed when the size of film to be viewed with the projector is changed. With the projector in the load position and the film completely rewound on one of the reels 30, 31 it is only necessary to remove screws 97 and 98 and lift links 62a and 63a from engagement with load plates 56 and 57 and the gate assembly 28 can be lifted from the projector housing and replaced with another which is suitable for handling the size film to be viewed.

A pair of loop sensors 101 and 102 are mounted adjacent opposite sides of gate assembly 28 for sensing the size of the loops of film between the capstan 52 and 53 and the film guide 75. Suitable loop sensors are Monsanto model No. MCA7. The loop sensors are employed in the capstan and reel motor control circuits described below.

A light source 105 (FIG. 1) such as an LED, and a light sensor 106, such as phototransistor, are mounted on opposite sides of shutters 27 to detect the closings of the shutter. Signals from the light sensor are employed in the frame control circuit described below.

According to one aspect of the present invention, the film guide 75 includes an arrangement for masking out peripheral portions of each or any frame of film. The masking arrangement is quite useful where it is desired to study a smaller selected area of each frme of a film sequence without distraction from adjacent areas or unexposed areas. Referring to FIG. 6, the masking arrangement includes a masking plate 110 which is slidable within the frame 112 of the film guide. The masking plate is provided with apparatus 114 of different sizes and shapes which may be aligned with film aperture 77. The appropriate aperture is selected according to the size and shape of the frame area to be viewed. The masking plate 110 is slidable within frame 112 of the film guide by rotation of a masking control knob 115. The masking control knob includes a shaft 117 having friction discs 118 mounted thereon in contact with masking plate 110.

In accordance with another aspect of the present invention the capstans 52, 53 and pinch rollers 54, 55 are so designed as to substantially eliminate the problem of "creeping" of film from between a capstan and pinch roller. Referring to FIG. 7, it will be noted that both capstan 52 and pinch roller 54 have end friction surfaces which are frusto-conical rather than cylindrical in shape. The friction surfaces 119 of capstan 52 are inclined inwardly toward the body of the capstan. The corresponding friction surfaces 120 of pinch roller 54 are inclined inwardly in the opposite directions, that is, away from the body of the pinch roller. The film is slightly wider than the effective height of capstan 52 and is bowed. The film ends are clamped between the complementary friction surfaces of capstan and pinch roller so as to be angled radially inwardly beneath the end caps 121 of the pinch roller. Should, therefore, the film tend to creep it would be directed inwardly and restrained by end caps 121 of the pinch roller. The angles 122 of the friction surfaces of the pinch roller and capstan are preferably about 2°.

To operate the projector, the load rods 65 and 66 turned to move load plates 56, 57 and film guides 75 to the load position. A roll of film is then placed on one of the reels, usually left reel 30. The film is threaded off the reel, between the left capstan and pinch roller, through the film guide, between the right capstan and pinch roller and onto the right reel 31. The load rods 65 and 66 are then returned to the run position causing pinch rollers 54 and 55 to contact capstans 52 and 53 and film drive belt 46 to be engaged with the drive slots in the film. Film loops of the proper size are formed automatically. The film loops serve as low inertia storage areas so that the film can be quickly accelerated in either direction. The operator selects the desired film speed and direction by means of the control panel 123 (see FIG. 3). The film is then moved in the selected direction at the selected frame rate. The image on each frame is projected through the path shown in FIG. 1 and onto a screen for viewing.

FILM DRIVE CONTROL CIRCUITS

Figure 8:
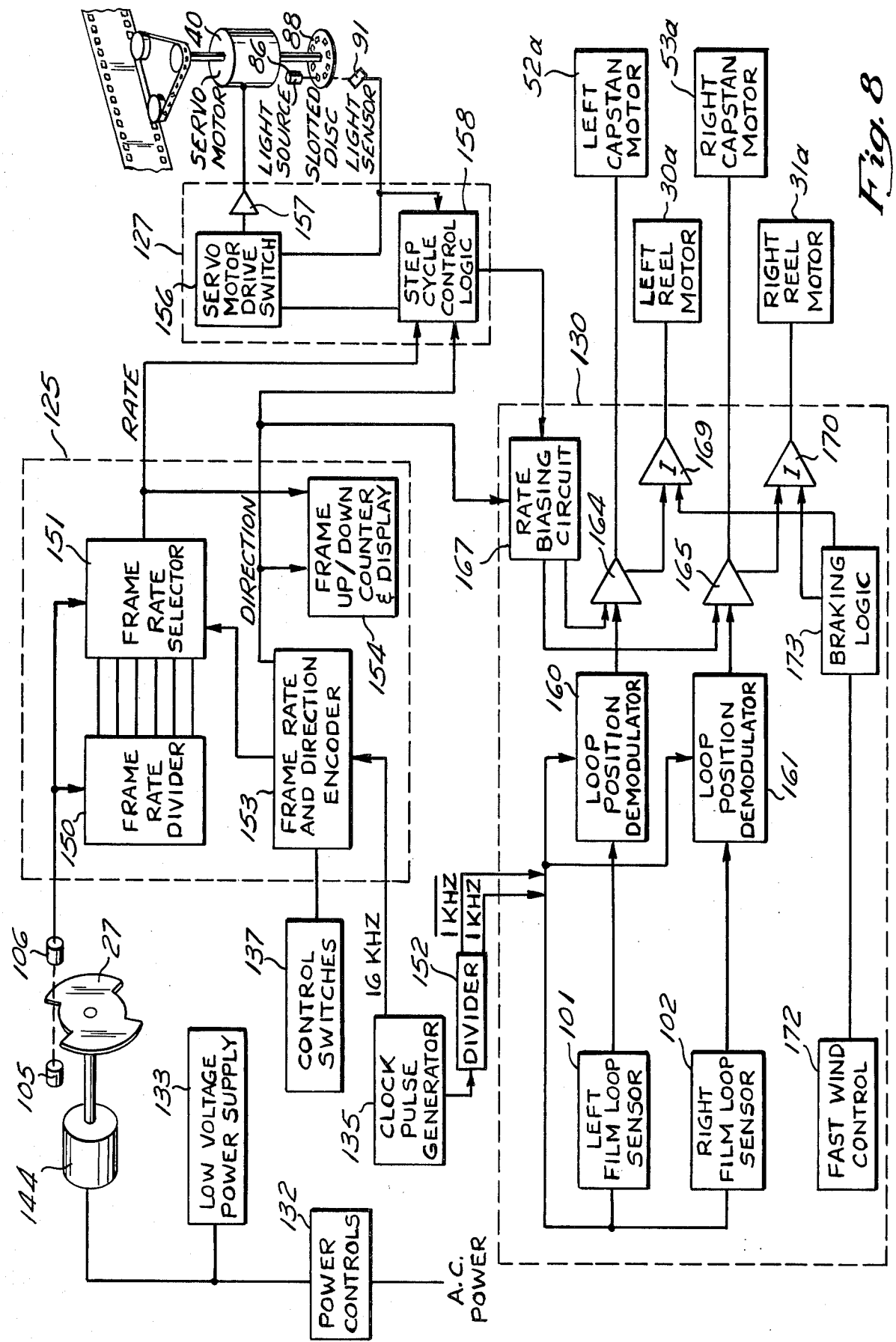
FIG. 8 is a block diagram of the control circuit for the film driving apparatus of the projector.

Referring now to FIG. 8, the controls for the film driving apparatus of the projector may be divided into three main circuits which are the frame control circuit 125, the servo motor control circuit 127 and the capstan and reel motor control circuit 130. The frame control circuit produces signals synchronized with shutter closings and at the selected frame rate which, along with a direction signal, are employed by the other circuits in carrying out their functions.

The control circuit for the servo motor 40 employs the signals from the frame control circuit to cause the servo motor to accelerate, run at substantially constant velocity and then decelerate and thereby pull film from the film loops and advance a single frame of film to its position within the frame aperture 77 for each frame rate signal received. The capstan and reel motor control circuits and the loop sensors cooperate to supply film to and take film from the film loops so as to maintain loops of constant size and with substantially constant tension on the film. These circuits also include fast wind controls with dynamic braking for high speed winding of film directly from reel to reel.

With the projector power on, pulses are generated continuously by shutter 27 which is driven by a synchronous motor 144. The shutter rotates at a constant speed of 30 revolutions per second and generates two pulses per revolution by interrupting a beam of light between light source 105 and light sensor 106. Each of the 60 pulses per second is coincident with the interruption of the light beam through the frame aperture 77. The pulses are transmitted to a frame rate divider 150 and to a frame rate selector 151. In the frame rate divider the shutter pulse rate is divided by two successively to produce frame rates from ½ the maximum of 60 frames per second down to slightly less than one frame per second. There is also a single frame advance as will be described below.

The clock pulse generator 135 provides pulses at a 16 KHz rate to the frame control circuit 125 and provides pulses through a divider 152 at a rate of 1 KHz in two opposite phases to the capstan and reel motor control circuit 130. The higher rate clock pulses are employed in an encoder 153 to encode a frame rate and direction selected by means of control switches 137 and these codes are supplied to the frame rate selector 151. In the frame rate selector 151 the code received from encoder 153 is employed to select pulses occurring at the desired frame rate. The encoder 153 also produces a direction signal which is transmitted along with the rate pulses from selector 151 to the step cycle control logic 158 in the servo motor control circuit. The frame rate and direction information is also supplied to a counter and display 154 which is useful for noting the location of important film areas.

In the servo motor control circuit 127 the frame rate and direction information is employed by the step cycle control logic 158 along with information from the frame position sensing arrangement associated with the servo motor to operate a servo motor drive switch 156 which controls an amplifier 157 for the servo motor.

As the servo motor 40 with its control advances the film strip frame by frame, film is taken from one film loop and supplied to the other. The film loop sensors 101 and 102 which indicate the size of the loop are modulated by the 1 KHz pulses from divider 152 and the resulting signals are demodulated by demodulators 160 and 161. The demodulated signals are provided to the inputs of amplifiers 164 and 165 which drive capstan motors 52a and 53a. The amplifiers 164 and 165 are provided with variable biasing according to the frame rate through a rate biasing circuit 167. Current amplifiers 169 and 170 derive their control inputs from, respectively, amplifiers 164 and 165 and drive the left and right reel motors 30a and 31a, respectively. Amplifiers 169 and 170 are also connected to the fast wind control circuit 172 and the associated braking logic 173.

FRAME CONTROL CIRCUIT

Referring now to FIG. 9, the shutter pulses from light sensor 106 (FIG. 8) which are coincident with the blocking or closed position of the shutter are provided to Schmitt trigger 180 and to the frame rate divider 150. The shutter pulses are also provided to frame rate selector 151 through an inverter 182 as maximum frame rate pulses. Frame rate selector 151 may be a standard No. 4512 multiplexer available from several manufacturers including Motorola Semiconductor. The frame rate selector, when not inhibited, scans input lines according to a binary code provided on lines 185, 186 and 187 and switches the selected input to output line 188. When so selected, the signal appearing at output 188 is a series of pulses having their leading edges coincident with the closing of shutter 27 and occurring at the selected frame rate. When no frame rate is selected, frame rate selector 151 is inhibited from operating in the manner described above by a signal from flip-flop 190 to the disable input 192 of the frame rate selector.

Clock pulse generator 135 supplies pulses to a binary counter 195. The output of the counter is provided to a forward frame rate scanner 198 and a reverse framerate scanner 199 each of which may be identical to and operate in the same manner as frame rate selector 151. The three low order bits from counter 195 are provided through lines 185 to 187 to frame rate selector 151. The highest order bit is provided to the disable input 197 of forward scanner 198 and, through inverter 201, to the disable input 202 of reverse scanner 199. This highest order bit serves as a direction signal.

Frame rate and direction commands to scanners 198 and 199 are provided from a frame rate and direction selector switch 205. The forward and reverse scanners scan their inputs searching for a frame rate and direction command. When such a command is found an output signal from the appropriate scanner appears on line 207 and is fed back to counter 195 to inhibit it from counting further. The same signal appears to the "S" input of flip-flop 190, which may be a No. 4013 dual D flip-flop, and enables the flip-flop to be reset upon the next pulse received from inverter 182. Frame rate selector 151 is then no longer disabled and switches the input signal appearing at the input designated by the code appearing in lines 185, 186 and 187 to output line 188. The signal from inverter 201 which indicates whether the frame rate command had been selected from the forward or the reverse scanner is provided to a forward-reverse flip-flop 210 which may be identical to flip-flop 190. Flip-flop 210 is switched to the appropriate forward or reverse signal state and maintained in that condition by frame rate pulses at output 188. The frame rate and direction signals are also provided to the frame rate counter and display 154 (FIG. 8).

A single frame advance command may also be provided by means of switch 205 which is handled by scanners 197 and 198 in the manner described above. The command is also passed through gate 212 to the single frame input of frame rate selector 151. When the single frame input is selected a single pulse coincident with the closing of shutter 27 appears at output 188 of the frame rate selector with the selected direction signal appearing at the output of flip-flop 210.

SERVO MOTOR CONTROL CIRCUIT

Servo motor 40 is controlled so that each frame of film is advanced in either direction by first accelerating the servo motor through a given amount of shaft rotation, preferably 15°, driving the servo motor at a substantially constant speed through another given amount of shaft rotation, preferably 30°, and then decelerating the motor through a given amount of shaft rotation, preferably 15°. Thus, in the given example a total of 60° of shaft rotation is required to advance each frame of film. The frame advancing operation is the same for all frame rates and merely occurs more or less often.

The amount of servo motor shaft rotation is determined by use of the slotted disc 89. With reference to FIG. 10, light source 86 (FIG. 8) and light sensor 91 are positioned on opposite sides of a slot 89 in slotted disc 88 so that the center line of the light beam is aligned with an edge of slot 89 when a frame of film is centered within film aperture 77. Thus, half the light beam is transmitted through slot 89 and half is blocked by the disc. Light sensor 91 is connected to amplifier 211 (FIG. 12) and with the parts in the position described above amplifier 211 is adjusted for zero output signal. As the disc is rotated by the servo motor, amplifier 211 will produce a sinusoidal output signal as shown in FIG. 13. Since the slots are spaced at 30° intervals a full cycle of the output signal occurs with each 30° of rotation of the servo motor shaft. The signal has a different polarity for the two directions of rotation.

Figure 12:
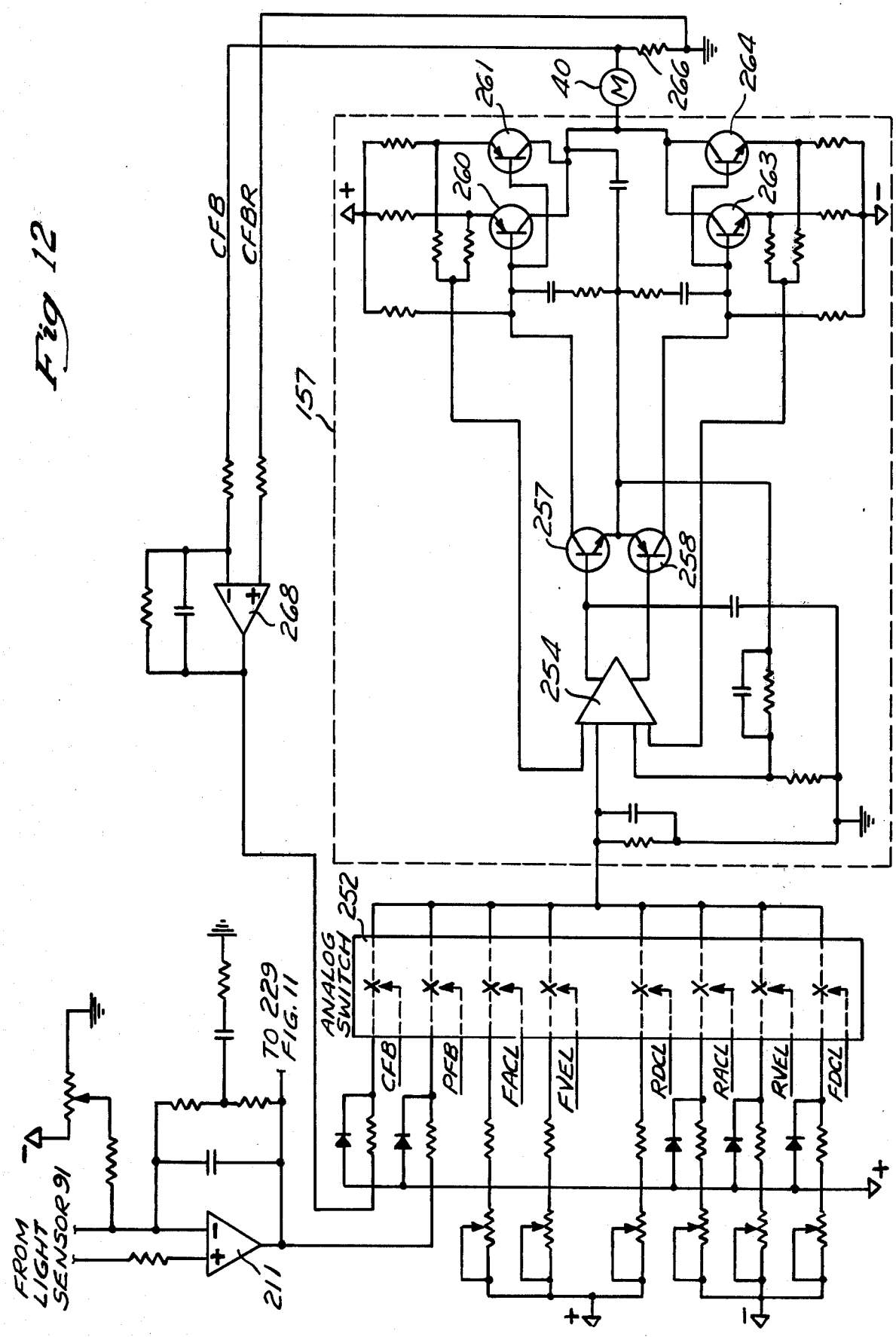
FIG. 12 is combined block and schematic diagram of the remainder of the servo motor control circuit.

The circuits shown in FIGS. 11 and 12 employ the frame rate signals and the signals from amplifier 211 to control the servo motor. Referring to FIG. 11, each frame rate pulse from frame rate selector 151 triggers a one shot 212 through an inverter 215 and a differentiator comprising capacitor 216 and resistor 218. One shot 212 produces a positive pulse having the same time duration at the light blocking period of shutter 27. The output of one shot 212 is connected through an inverter 221 to the reset inputs of a pair of flip-flops 223 and 224 which may be identical to flip-flop 190. The flip-flops are held in the reset condition at all times except for the duration of the output pulse from one shot 212. The output of inverter 221 is also the position feedback or P.F.B. control signal for servo motor drive switch 156 as described below. The output of one shot 212 is also connected to AND gate 226, the other input to which is the reset output of flip-flop 223. The output of AND gate 226 is connected to one input of AND gate 227, the other input to which is the reset output of flip-flop 224. The output signal from AND gate 226 is also the current feedback or C.F.B. control signal to servo motor drive switch 156.

The input to flip-flop 224 is from flip-flop 223 while the input to the latter is from amplifier 229 through NAND gates 230 to 233. The input to amplifier 229 is from amplifier 211 (FIG. 12) which is connected to the position light sensor 91 (FIG. 8). The output of amplifier 229 is connected to NAND gate 230 and, through inverter 231 to NAND gate 232. The remaining inputs to gates 230 and 232 are direction signals from forward-reverse flip-flop 210. The output signals from gates 230 and 232 are entered into another NAND gate 233 the output of which is connected to flip-flop 223. The effect of the gating is to provide signals from gate 233 indicating the angular position of the servo motor shaft which are the same in polarity without regard to the direction of rotation of the servo motor.

The output signals from flip-flops 223 and 224, AND gate 227 and the direction signal from flip-flop 210 are the inputs to a series of AND gates 236 through 241 which provide control signals to servo motor drive switch 156 to produce acceleration, constant velocity, and deceleration of servo motor 40 in the appropriate direction.

As shown in FIG. 12, the servo motor drive switch includes an analog switch 252 along with appropriate biasing signals connected to its input to cause servo motor 40 to be driven in the desired manner. When a control input of analog switch 252 is actuated by a control signal the signal at the corresponding analog input is switched to the input of an operational amplifier 254 in the servo motor amplifier 157.

The output of operational amplifier 254 is connected to the bases of a pair of control transistors 257 and 258. The collector of transistor 257 is connected to the bases of a pair of power transistors 260 and 261 which are arranged so as to supply current to drive servo motor 40 in the forward direction. Similarly, the collector of transistor 258 is connected to the bases of a pair of power transistors 263 and 264 which are arranged to drive servo motor 40 in the reverse direction.

A resistor 266 is connected in series with servo motor 40. The input terminals of an operational amplifier 268 are connected across the resistor to sense the current through the motor and provide current feedback through analog switch 252 to the servo motor whenever the C.F.B. control signal is present.

Operation of the servo motor control circuit will be understood by reference to FIG. 13 along with FIGS. 10 to 12. A rate pulse from frame rate selector 151 indicates that the shutter is in the closed position and that a frame may be advanced. The rate pulse fires one shot 212 to produce a pulse of a given length as described above. The signal from one shot 212 is inverted and removes the reset signal from flip-flops 223 and 224. The inverted signal also disconnects amplifier 211 from servo motor drive amplifier 157 by opening analog switch 252 so that the amplifier will not attempt to maintain the zero position of the servo motor shaft during frame advance.

The pulse from one shot 212 also enables AND gate 226 to provide a C.F.B. control signal and a path for current feedback from amplifier 268 to servo motor amplifier 157. At the same time AND gate 227 is enabled and provides a signal to the acceleration gates 240, 241. Whichever of these gates is enabled by forward-reverse flip-flop 210 will provide an acceleration control signal to analog switch 252. Servo motor 40 will accelerate in the appropriate direction and amplifier 211 and gate 233 will begin to provide the output signals shown in FIG. 13. After 15° of servo motor shaft rotation the output of gate 233 becomes positive and sets flip-flop 223. The output signal from flip-flop 223 causes the removal of the C.F.B. and acceleration control signals from analog switch 252 and enables the appropriate velocity gate 236, 237.

During the constant velocity period the servo motor shaft rotates at approximately twice the average angular velocity at which it rotates during the acceleration and deceleration periods so that the signals from amplifier 211 and gate switch 233 are compressed in time as shown in FIG. 13. The 30° of angular rotation occurs in about the same time period as the 15° of rotation in the acceleration and deceleration periods. At the end of this constant velocity period flip-flop 223 is reset which again enables AND gate 226 to provide a C.F.B. control signal. Flip-flop 224 is also set and disables AND gate 227 and enables the appropriate deceleration gate 238, 239. The appropriate deceleration signal is then provided to servo motor 40 by servo motor amplifier 157.

The duration of the pulse from one shot 212 is chosen to be slightly less than the blocking period of shutter 27. At the end of the pulse flip-flops 223 and 224 are again reset, AND gates 226 and 227 are disabled and the P.F.B. control signal is again provided by inverter 221 to analog switch 252. Amplifier 211 then provides a signal to complete the deceleration of the servo motor and position the shaft at a new zero or equilibrium position 60° from the previous position. By the time the shutter is opened the new frame is properly positioned and at rest ready for projection upon a screen.

The frame advance sequence begins once more upon receipt of the next rate pulse from frame rate selector 151, which, at the maximum rate occurs on the next shutter closure and at lower rates after skipping a number of shutter closures.

The sequence for advancing a single frame is substantially as described above with only a single frame rate pulse being received from frame rate selector 151.

CAPSTAN AND REEL MOTOR CONTROL CIRCUIT

The capstan and reel motors are controlled to maintain constant loop sizes as the film is advanced frame by frame in either direction. Provision is also made for maintaining substantially constant tension on the film by referencing the drive circuit of each reel motor to that of the respective capstan motor. Also included is a fast wind control circuit with associated fast wind dynamic braking circuit.

As each frame of film is advanced in either direction, one film loop tends to become smaller while the other tends to become larger. In response to these movements of the loops the loop sensors provide signals which cause the capstan and reel motors to move to restore each loop to its usual size.

As shown in FIG. 14, loop sensors 101 and 102 each comprise an LED which are connected in series with a transistor 301. The base of transistor 301 is connected to the out-of-phase 1 KHz signal from divider 152. The LED's are thus modulated to emit a suitable amount of light which is reflected from the respective film loop onto a photo transistor portion of the loop sensor. The output signals from the loop sensors are coupled through capacitors 306 and 307 and through analog switches 309 and 310 to their respective left and right capstan and reel motor drive circuits 314 and 315. The right capstan and reel motor drive circuit 315 is shown in detail and will be described fully below. The left capstan and reel motor drive circuit 314 is identical to circuit 315 and need not be described in detail.

The signal from the right loop sensor is switched through two paths of analog switch 310. One path 310a is controlled by the 1 KHz signal and is connected to the inverting input of operational amplifier 320 while the other switch path 310b is controlled by the 1 KHz out-of-phase signal and is connected to the non-inverting input of amplifier 320. The effect of such switching is to invert the phase of the signal seen by the amplifier 320 synchronously with the signal from the phototransistor, thus recovering a D.C. signal proportional to the amplitude of the 1 KHz signal from the phototransistor.

Amplifier 320 is provided with input biasing proportional to the frame rate. The biasing is provided through line 322 to the non-inverting input for movement of the film in one direction and through line 324 to the inverting input for movement of the film in the other direction. Frame rate pulses are switched through paths 327a or 327b of analog switch 327 depending on whether the film is being advanced in the forward or reverse direction. For the forward direction the direction signal at the control input of switch path 327a switches rate pulses to the non-inverting input of amplifier 320.

Switch path 327b cannot pass signals for the forward direction because its control input is grounded through switch path 327c which is closed by the forward direction signal. In the reverse direction of film movement the control inputs for switch paths 327a and 327c are grounded so that the paths are open while switch path 327b is closed by the positive signal at its control input. The rate biasing signals to amplifier 320 improve the circuit response and help to provide faster and smoother loop size corrections.

When the error output signal from operational amplifier 320 is positive transistor 330 is conductive and turns on power transistor 332 which provides current to right capstan motor 53a in the proper direction to decrease the loop size and supply film to right reel 31. Correspondingly, when the error signal from amplifier 320 is negative transistors 334 and 335 are conductive and the capstan motor is driven in the opposite direction.

Each reel motor is supplied with current in only one direction, that is, for tensioning film. When acting as a takeup reel, the reel motor is driven in the direction dictated by the current supplied thereto. When acting as a pay-out reel, the reel motor is rotated in the opposite direction with only enough current supplied thereto to maintain proper tension on the film as described below. The right reel motor 31a rotates in the counterclockwise direction when acting as a take-up reel as examination of FIG. 4 will indicate. Current is supplied to right reel motor 31a through a power transistor 340 and a control transistor 342. Control transistor 342 is normally biased into conduction by current supplied from positive voltage source 345 connected to its base and maintains power transistor 340 in conduction. In order to maintain substantially constant tension on the film it is desired that reel motor 31a be controlled with reference to capstan motor 53a. For this purpose transistor 347 has its collector connected to the base of transistor 342 and its base and emitter connected across a resistor 350 in the emitter circuit of power transistor 335. When transistor 335 is substantially non-conductive transistor 347 is also substantially non-conducting while transistors 342 and 340 are highly conductive and supply current to right reel motor 31a. Thus, when the error signal at the output of operational amplifier 320 is such as to cause right capstan motor 53a to take film out of the loop, right reel motor 31a is driven proportionally so as to take film from the capstan at a rate sufficient to maintain substantially constant tension on the film.

When the error signal at the output of operational amplifier 320 is such that power transistor 335 is conducting and causing right capstan motor 53a to supply film to the loop, the voltage drop across emitter resistor 350 turns on transistor 347 which tends to turn off transistors 342 and 340 and allow the right capstan motor to pull tape from the right reel 31. The small amount of current which is supplied to right reel motor 31a in this situation provides a small retarding torque on the reel motor sufficient to maintain substantially constant tension on the film.

The usual operation of the capstan and reel motor circuits are as described above. It will be appreciated that the operation of the left capstan and reel motor drive circuit 314 is substantially the same as and analagous to the operation of right capstan and reel motor drive circuit 315 although, of course, the two circuits will be operating in opposite modes at any given time.

Provision is also made in the capstan and reel motor control circuits for high speed winding of tape in both the forward and reverse directions which includes a unique dynamic braking arrangement. In high speed winding the film is wound only from one reel to the other and does not pass between capstan and pinch rollers as in the usual "run" mode. High speed operation is blocked out during the run mode and is permitted only when the load rods 65 (FIGS. 3 and 4) are in the load position. During the run mode a run switch 355 is closed by load runs 65 and operates a load-run relay 357 with contacts 357a and 357b. During the run mode contacts 357a are open while contacts 357b are closed and connect right capstan motor 35a to ground. During the load mode contact 357b disconnects capstan motor 53a from ground so that the motor cannot be operated while contact 357a grounds the base of a transistor 359 which has its collector connected to the base of transistor 347. The emitter of transistor 359 is connected to the forward output of fast wind control circuit 172. The reverse output of fast wind control circuit 172 is connected to the emitter of a corresponding transistor in the left capstan and reel motor drive circuit 314.

During normal run operation, the base of transistor 359 is open so that the transistor is maintained non-conductive even if fast wind control circuit 172 should be inadvertently operated to provide a forward fast wind signal. When transistor 359 is not conductive it does not affect transistor 347 so that control of right reel motor 31a is as described above. In the load mode, however, there is no voltage drop across resistor 350 so that transistor 347 and reel motor 31a are controlled through transistor 359. If no fast wind signal has been given, both the forward and reverse outputs of control circuit 172 are positive so that transistor 359 is conductive and turns on transistor 347 which renders transistors 342 and 340 non-conductive. When the emitter of transistor 359 is grounded by a forward fast wind signal from control circuit 172 both transistors 359 and 347 are turned off and transistors 340 and 342 are turned on to supply current to reel motor 31a and cause it to wind film onto right reel 31 from the left reel 30.

The fast wind control circuit 172 includes forward switch 362 and reverse switch 363 along with positive biasing circuits 365 and 366. The switches and biasing circuits are connected to a series of NAND gates 368 to 375 connected as shown. A dynamic braking control circuit 378 including transistors 379 and 380 and capacitor 383 is connected to one input of gate 370 in the reverse portion of the fast wind control circuit. The collector of transistor 379 is connected to an input of gate 370 while the emitter of transistor 380 is connected to the collector of transistors 340 and 342 which control current to right reel motor 31a. An identical dynamic braking control circuit is provided in the left capstan and reel motor drive circuit 314 and has its output connected to an input of gate 371 in the forward portion of the fast wind control circuit as indicated in FIG. 14.

Prior to fast wind operation there is essentially no current being supplied to right reel motor 31a so that the voltage level at the emitter of transistor 380 in the dynamic braking circuit is high. Transistor 380 is, therefore, substantially non-conductive while transistor 379 is conductive and the signal at the input of gate 370 is low. Operation of forward fast wind switch 362 provides a low input signal to gate 373 which produces a high signal to the input of gate 375. The low signal from switch 362 is also provided to the input of gate 368 which produces a high output signal to gate 370. Since the other input to gate 370 is low the output of the gate is high and the remaining input to gate 368 is also high. With both inputs to gate 372 high the output of the gate is low and the output of gate 374 is high. With both inputs to gate 375 high the output of the gate is low. Transistors 359 and 347 are thus turned off while transistors 340 and 342 are turned on to supply current to reel motor 31a. With transistors 340 and 342 conductive the signal level at the emitter of transistor 380 becomes more negative. Transistor 380 is turned on and turns off transistor 379 so that the input to gate 370 becomes high. With both inputs to gate 370 high the output becomes low and the output of gate 372 becomes high.

When forward fast wind switch 362 is returned to its open position the input of gate 373 goes high and, with the remaining input also high, the output becomes low and the output of gate 375 becomes high. Transistor 359 is thus rendered conductive and turns on transistor 347 which turns off transistors 340 and 342. The high signal at the output of gate 375 is also coupled to gate 374 and, since the remaining input to that gate is high, the output becomes low. This turns off the transistor in left capstan and reel motor drive circuit 314 which corresponds to transistor 359 and causes current to be supplied to left reel motor 30a tending to produce a retarding or braking torque in the left reel motor. Since the driving current to the right reel motor has been interrupted the current supplied to the left reel motor brakes both reel motors.

With transistors 340 and 342 non-conductive the signal level at the emitter of transistor 380 becomes more positive tending to cut off transistor 380. Capacitor 383 then begins charging and after a time delay governed by the time constant of the charging circuit transistor 379 is turned on and the signal level at the input of gate 370 becomes low. The signal at the output of gate 370 then becomes high. Since the remaining input of gate 372 is high the output of the gate becomes low and switches the output of gate 374 to its high condition which turns off the braking current to left reel motor 30a. Thus, removal of the fast wind signal in either direction automatically results in dynamic braking of the undriven reel motor as current to the driven reel motor is interrupted and then interruption of the braking current after a short time.

While a preferred form and embodiment of the present invention has been described and illustrated herein it will be apparent to those who come to understand the essential principles of the invention that other forms and embodiments may be employed without departing from the spirit and scope of the invention. Accordingly, this invention is not to be limited to the form and embodiment herein specifically disclosed nor in any other way inconsistent with the progress in the art promoted by the invention.

What is claimed is:

1. A projector for motion picture film comprising means defining a frame aperture, means for projecting a beam of light through said aperture, a shutter for interrupting said light beam, a servo motor and means for connecting said servo motor to a strip of film, a circuit associated with said shutter for controlling said servo motor to cause it to position a frame of said film strip in said aperture during said interruption of said light beam, a capstan and a pinch roller on each side of said frame aperture, means for determining the amount of film between each of said capstans and said frame aperture, circuit means operatively connected to said amount of film determining means for controlling said capstans to maintain a film loop substantially constant size between each of said capstans an said frame aperture, a motor driven reel adjacent each of said capstans for storing film, and circuit means responsive to said capstan control circuit means for controlling each of said reels to take film from and supply film to corresonding ones of said capstans while maintaining substantially constant tension on said film.

2. A projector as claimed in claim 1 wherein said means for projecting a beam of light through said aperture includes a lamp, a mirror and a lens, each having dichroic surfaces to prevent transmission of infra-red light along the optical path.

3. A projector as claimed in claim 1 further comprising a housing, and a gate assembly on said housing between said reels and said shutter, said gate assembly including means for positioning each frame of said film in sequence before said shutter, said gate assembly being readily removable from said housing.

4. A projector as claimed in claim 1 wherein said means defining a frame aperture includes a guide body defining a substantially flat passage for said strip of film, said body having said aperture for projection of said beam of light through a frame of said film, a frame masking member slidable in said guide body and having a plurality of masking apertures therein for masking a frame of film, and means for sliding said masking member in said guide body to position a selected one of said masking apertures in said frame aperture.

5. A projector as claimed in claim 1 wherein said capstan and said pinch roller each have a cylindrical body with a frustoconical portion adjacent each end, said frustoconical portions on said pinch roller being mutually inverted with respect to those on said capstan and having the same slope as those on said capstan, whereby said frustoconical portions at corresponding ends of said capstan and said pinch roller are parallel and adapted to retain film therebetween.

6. A projector as claimed in claim 5 wherein said frustoconical portions on said capstan decrease in diameter toward the center of said capstan body while said frustoconical portions on said pinch roller increase in diameter toward the center of said pinch roller body.

7. A projector as claimed in claim 5 wherein said frustoconical portions slope at an angle of 2° with respect to the longitudinal axes of said capstan and said pinch roller.

8. A projector as claimed in claim 5 wherein the lengths of said capstan and said pinch roller are slightly less than the width of film to be held therebetween, whereby said film is bowed between said capstan and pinch roller.

9. Apparatus for advancing a frame of a motion picture film during the closed position of a shutter comprising, a servo motor, means connecting said servo motor to said film, means for generating a signal indicating a closing of said shutter, switch means for providing a selected frame rate command, means for providing signals in response to successive predetermined angular positions of the servo motor shaft, circuit means responsive to said shutter-closed signal and said frame rate command and said angular position responsive signals in sequence for producing acceleration, constant velocity and deceleration signals in sequence and, means responsive to said acceleration, constant velocity and deceleration signals for controlling said servo motor to advance said frame.

10. Apparatus as claimed in claim 9 wherein said means for generating a signal indicating a closing of said shutter includes means for providing a light beam and means for providing a pulse in response to interruption of the light beam by said shutter, and further comprising a divider for dividing the rate of said light interruption responsive pulses to produce a plurality of pulse trains having different pulse rates, each pulse in each pulse train indicating a closing of said shutter, and circuit means for selecting one of said pulse trains in accordance with said selected frame rate command.

11. Apparatus as claimed in claim 9 further comprising means for providing a selected direction command signal and wherein said acceleration, constant velocity and deceleration signal responsive means is also responsive to said selected direction command signal for controlling said servo motor to advance said frame in the desired direction.

12. Apparatus as claimed in claim 9 wherein said means for providing signals in response to successive predetermined angular positions of said servo motor includes a slotted disc mounted on the shaft of said servo motor, a light source and a light sensor mounted on opposite sides of said disc for producing signals that vary in accordance with the variations in light passing said disc.

13. Apparatus as claimed in claim 12 further comprising an amplifier connected to the output of said light sensor, said amplifier providing a zero output signal when the light beam from said light source is centered at the edge of a slot, providing a maximum signal of one polarity when said light beam is centered at the center of a slot and providing a maximum signal of the opposite polarity when said light beam is centered at the center of a space between slots.

14. Apparatus as claimed in claim 13 wherein said slots are spaced at 30° intervals about the periphery of said disc, said acceleration signal occurs during 15° of angular rotation of said servo motor shaft, said constant velocity signal occurs during 30° of angular rotation at the end of said acceleration signal, and said deceleration signal occurs during 15° at the end of said constant velocity signal.

15. Apparatus as claimed in claim 13 wherein the output of said amplifier is provided to said servo motor to maintain and correct the position of said frame of film in the absence of a shutter-closed signal.

16. Apparatus as claimed in claim 9 wherein said means responsive to said acceleration, constant velocity and decleration signals comprises an analog switch controlled by said signals and an amplifier connected between said servo motor and said analog switch, input signal means for said amplifier connected to the input of said analog switch for providing input signals to said amplifier to cause it to drive said servo motor in accordance with said acceleration, constant velocity and deceleration signals.

17. In a motion picture projector having a projector station, the combination comprising a capstan and capstan motor for driving film, solid state switch means for supplying current to drive said capstan motor in either direction of rotation, means for determining and providing a signal indicating the amount of film stored between said capstan and said projection station, means responsive to said stored film signal for providing a signal to said solid state switch, means to drive said capstan motor in the proper direction to maintain a substantially constant amount of stored film, and a reel and reel motor for providing film to and receiving film from said capstan.

18. The combination as claimed in claim 17 further comprising, solid state switch means for supplying current to said reel motor in one direction and, control switch means connected between said capstan motor solid state switch means and said reel motor solid state switch means for causing said reel motor switch means to supply current to drive said reel motor in accordance with the amount and direction of current supplied to said capstan motor to maintain constant tension on said film.

19. The combination as claimed in claim 17 wherein said film stored between said capstan and said projection station is in the form of a loop and said means for determining and providing a signal indicating the size of said loop comprises a light source and a light sensor for sensing the amount of light reflected from said film loop and providing a signal indicating said amount.

20. The combination as claimed in claim 17 wherein said means responsive to said stored film signal comprises an operational amplifier having a dual polarity output signal.

21. The combination as claimed in claim 18 wherein said capstan motor solid state switch means includes a transistor for supplying current to said capstan motor to cause it to drive film toward said loop, and wherein said control switch means comprises a transistor having its base and emitter connected across an emitter resistor of said capstan motor transistor and having its collector connected to said reel motor switch means to cause said reel motor switch means to increase current to said reel motor as current through said capstan motor transistor decreases, and to decrease current to said reel motor as current through said capstan motor transistor increases, whereby substantially constant tension is maintained on said film.

22. In a motion picture projector having a pay-out reel motor and a take-up reel motor, a circuit for controlling said reel motors for fast winding of film from said pay-out to said take-up reel comprising, a solid state switch means for each reel motor for supplying current thereto, a control switch coupled to each solid state switch means, logic switching means having respective outputs connected to said control switches, respectively, for providing fast wind signals to cause current to be supplied to said take-up reel motor for fast winding of film, and means between said solid state switching means for said take-up reel and said logic switching means for providing a logic signal to said logic switching means indicating the conductive state of said solid state switching means, said logic switching means being arranged to provide a signal to said control switch of said pay-out reel motor to cause current to be supplied to said motor when said take-up reel solid state switch is conductive and said fast wind signal to said take-up reel control switch is removed, whereby said current to said pay-out reel motor brakes said pay-out and take-up reels.

23. A circuit as claimed in claim 22 wherein said means for indicating the conductive state of said take-up reel solid state switching means includes a delay means, whereby braking current to said pay-out reel is interrupted after a delay.

24. A projector as claimed in claim 1 further comprising switch means for selecting a frame projection rate, said switch means operatively connected to said circuit for controlling said servo motor to cause it to position a frame of film in said aperature during certain interruptions of said light beam in accordance with said selected frame projection rate.

25. Apparatus for projecting motion picture film at variable rates of speed comprising means defining a frame aperature, means for projecting a beam of light through said aperature, a shutter for interrupting said light beam by successively closing and opening at a substantially fixed rate, means for generating a signal indicating a closing of said shutter, a servo motor and means for connecting said servo motor to a strip of film, switch means for selecting a frame projection rate, means operatively connected to said switch means and to said shutter-closed signal generating means for producing a command signal to advance a frame during the closed position of said shutter in accordance with the selected frame projection rate, circuit means responsive to said command signal producing means for controlling said servo motor to cause it to position a frame of said film in said aperature.

26. Apparatus as claimed in claim 25 further comprising a capstan on each side of said frame aperature, circuit means for controlling said capstans to maintain a substantially constant amount of film between said capstan and said frame aperature, a motor driven reel adjacent to each of said capstans for storing film, and circuit means for controlling each of said reels to take film from and supply film to corresponding ones of said capstans.

* * * * *